April 13, 1926.

L. J. SKROMME

DRIER STRUCTURE

Filed Feb. 19, 1925

Witness

Inventor
Lars J. Skromme
by Beir & Dreeman Attorneys

April 13, 1926.

L. J. SKROMME

DRIER STRUCTURE

Filed Feb. 19, 1925

Witness

Inventor
Lars J. Skromme
by Bair & Freeman Attorneys

Patented Apr. 13, 1926.

1,580,767

UNITED STATES PATENT OFFICE.

LARS J. SKROMME, OF ROLAND, IOWA.

DRIER STRUCTURE.

Application filed February 19, 1925. Serial No. 10,256.

*To all whom it may concern:*

Be it known that I, LARS J. SKROMME, a citizen of the United States, and a resident of Roland, in the county of Story and State of Iowa, have invented a certain new and useful Drier Structure, of which the following is a specification.

My invention relates to a structure for use in drying seed corn and other grains, which is adaptable for a great variety of purposes and to a process in which such a structure or a similar one may be employed.

More particularly, it is my purpose to provide in a structure of the kind under consideration, a series of cribs, which may be arranged in line adjacent to an air chute which also serves as a runway, controllable means of communication being provided between the chute and each separate compartment or crib.

A further purpose is to provide in such a structure false perforated bottoms for the cribs above the main bottoms thereof and above the openings into the chute.

Still a further purpose is to provide in such a structure, means for forcing heated air into the chute.

It is also my purpose to provide means for controlling the temperature of the heated air.

With these and other objects in view, my invention consists in the construction, arrangement and combination of the various parts of my drier structure, whereby the objects contemplated are attained, as hereinafter more fully set forth, pointed out in my claims, and illustrated in the accompanying drawings, in which:

It is well known that in those sections of the country where corn is raised on a large scale, it is of great importance to be able to properly save and treat seed corn.

In some years, for instance this year, much of the corn has been soft at the time when it must be picked in order to save the seed corn before the corn in the field has been frosted. Where seed corn in handled on a large scale, it is a difficult matter to dry it out properly. If the weather is wet, so that the air remains damp for a considerable period, it is almost impossible to dry out the corn without artificial drying and heating means without moulding.

It is my purpose therefore to provide means and a process whereby seed corn may be thoroughly dried out in large quantities with a minimum likelihood of injury to the corn.

In general, I accomplish this purpose by placing the corn in cribs about eight feet square and six feet high, and forcing heated air through the corn. I have found it difficult to control the temperature of the air and therefore consider the temperature control one of the important features of my invention.

It is further true that the apparatus must be such as to facilitate the convenient and rapid handling of the corn, and this makes the arrangement of parts as suggested herein of considerable importance.

Figure 1:
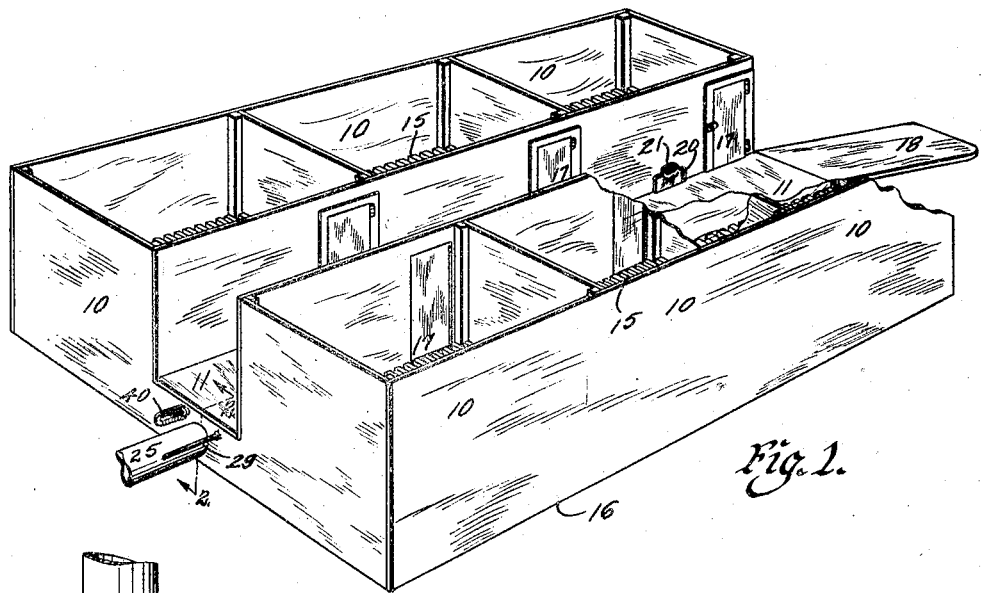
Figure 1 shows a perspective view of a series of cribs with an air chute and runway arranged between them embodying features of my invention.
Figure 2:
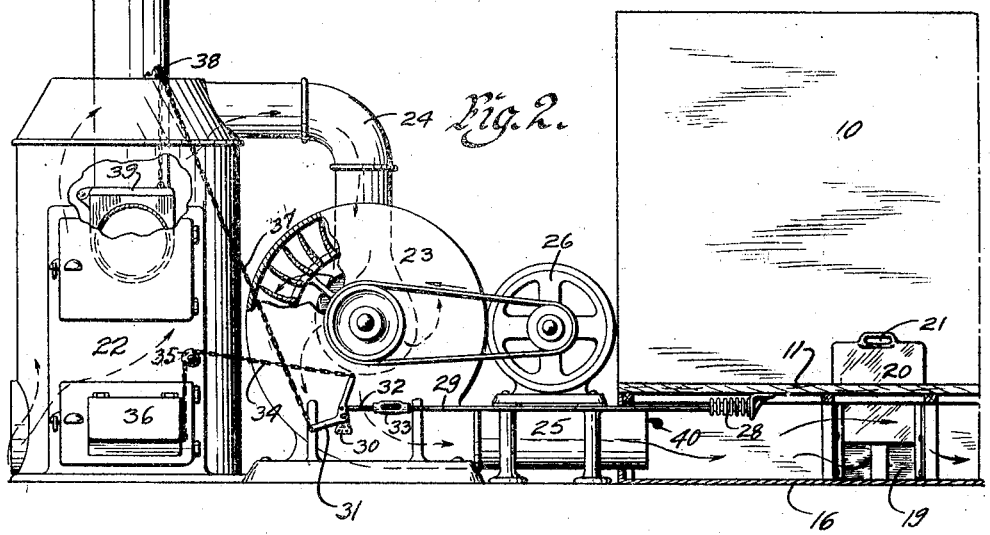
Figure 2 is an elevaton, parts being shown in section and parts being broken away, illustrating the cribs, the chute, and the air controlling means.
Figure 3:
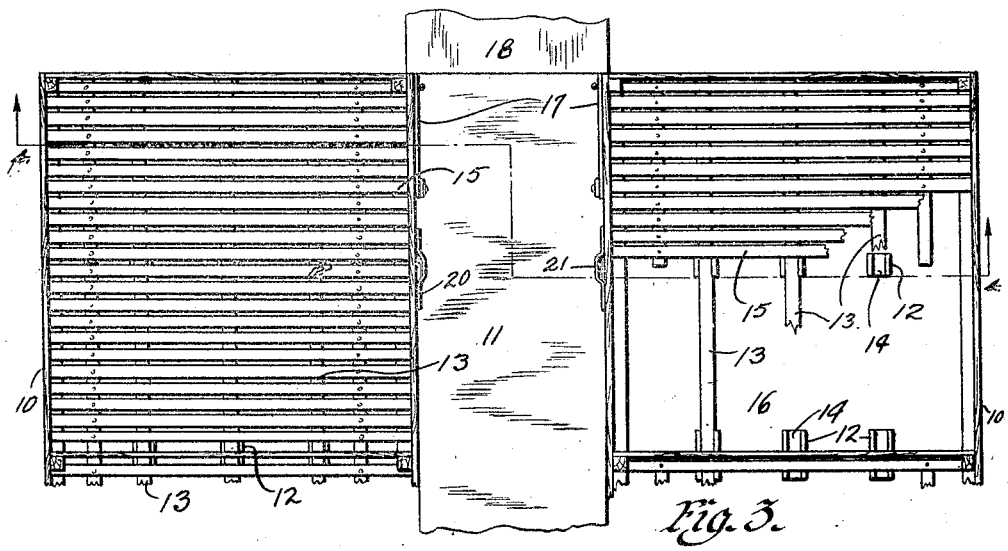
Figure 3 is a top plan view of a portion of the cribs and air chute.
Figure 4:
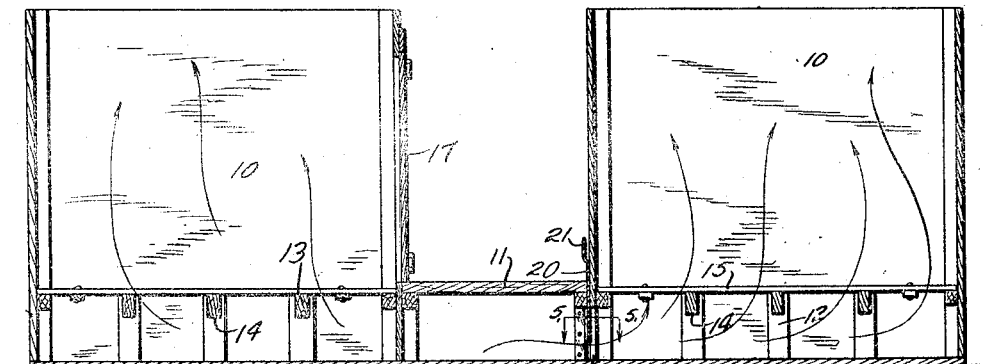
Figure 4 is a vertical, transverse, sectional view taken on the line 4—4 of Figure 3.
Figure 5:
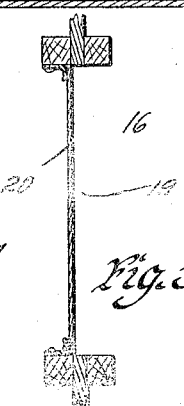
Figure 5 is a detailed, sectional view taken on the line 5—5 of Figure 4.

In the practice of my invention, I arrange a series of compartments 10 in alignment as shown in Figure 1 of the drawings herewith. These compartments may, of course, vary in size, but I have found that a compartment or crib six feet high, and approximately eight feet square is satisfactory.

For practical purposes, I have found it desirable to use two rows of cribs 10 arranged in parallel lines spaced from each other, as shown in Figure 1.

Arranged between the rows of cribs 10 at the bottoms thereof is an air chute or flue 11. Closure control openings are arranged between the lower part of each crib or compartment 10 and the chute or flue 11, as hereinafter referred to, and air is forced into the chute or flue 11 and thence into the respective compartments in which the corn is to be dried.

In order that the air may pass upwardly to the top of the pile in each crib, the walls of each crib 10 are imperforate.

In each crib, the opposite side walls are provided with upright posts 12 extending upwardly to about the height of the flue or chute 11.

A false bottom is provided for each compartment or crib comprising sleepers or cross bars 13 having their ends received in sockets 14 in the post 12. If desired, the posts 12 may be provided between the walls of the cribs or compartments to support the cross bars 13. Laid on the cross bars 13 of each crib is a false bottom 15 made of connected slats and made in as many sections as may be desired.

It will be seen that the false bottom 15 and the bars 13 may be removed if desired. This is of considerable importance. The false bottom is provided in order to allow for free circulation of air underneath the corn, and to permit the air to enter the corn from below at all points in the horizontal area of the crib. The false bottom, of course, must have such openings as to permit the air to pass freely upwardly into and through the corn.

Because the corn sometimes shells freely, it is obvious that the shelled corn will drop through the false bottom, and it is then necessary that the false bottom be removable to permit access to the bottom 16 of the crib for permitting the easy removal of the shelled corn.

Preferably each crib or compartment is provided with a door 17 opening above the flue and runway 11, so that the corn may be shoveled from the crib onto warehouse trucks, using the flue as a runway. At one end of the flue is an inclined runway member 18 over which the trucks may be run from or to the runway.

In the wall, which separates the flue or chute 11 from the compartments 10, there is provided for each compartment 10 an opening 19.

The movement of air through the opening 19 is controlled by means of a slidably mounted door or closure element 20, which has a handle 21 above the flue 11 and outside the compartments 10.

It is necessary to have a controllable closure member for regulating the access of air to each compartment 10 separately in order that the warm air may be supplied to the cribs according to their respective requirements and in order to close access to any empty cribs.

The cribs are filled at different times and with different kinds of corn requiring different drying periods so that separate control of the air flow to each crib is necessary.

Air control and heating means.

I have provided means for supplying heated air to the flue 11 for controlling the temperature thereof as follows: Suitable heating means, such as the furnace 22 is provided near the compartments 10.

A large fan or pump 23 is arranged to draw air from the furnace through a pipe 24 and to force the air through a pipe 25 to one end of the flue 11. The fan 23 is operated from a motor 26.

I have found that it is quite difficult to properly regulate the flow and temperature of the heated air.

It is, of course, desirous to avoid heating the air to too high a temperature, because the corn will then be dried out too quickly and will sometimes be spoiled. This danger is partially avoided by providing a long flue 11 and by providing the spaces under the floors 15, which affords a large space for the dispersing of the air, and for cooling before the air comes into direct contact with the corn. This provision of a considerable space for cooling the hot air and mixing it with the air already in the flue and the bottoms of the compartments seems to be necessary, even where an additional temperature control means is provided.

I provide another control means, comprising a heat actuated thermostat 28 of any suitable form arranged in the flue 11 adjacent to the point where the air enters the flue from the pipe 25 and preferably at the top of the flue.

Connected with the thermostat is a control rod 29. Suitably mounted on a bracket 30 is a bell crank lever 31 to which is pivoted a rod 32. The rods 32 and 29 are connected to a turn buckle 33. One end of the bell crank lever 31 is connected by a chain 34 extending over a pulley 35 with the draft door 36 of the furnace 22. The other end of the bell crank lever 31 is connected by a chain or other flexible device 37 extended over a pulley 38 with the check door 39 of the furnace.

It will thus been seen that by the use of a thermostat, the action of the furnace can be controlled for regulating with a certain degree of accuracy the temperature of the air entering the flue 11.

By providing the flue 11 of considerable length and providing the open spaces underneath the false bottoms of the compartments 10, I find that the temperature of the air forced upwardly through the corn can be controlled to a sufficient degree for accomplishing the purpose of not overheating the corn and of drying the corn rapidly enough to get the best results.

Whenever corn is placed in one or more of the compartments 10, the furnace 22 may be started and the motor 26 operated for working the fan or pump 23 for forcing heated air to the chute 11. The sliding doors 20 of the compartments 10 containing corn are opened, and the heated air will be forced into the spaces below the false bottoms of such compartments and will pass upwardly through the corn.

If one batch of corn has more moisture in it than another, one door 20 may be opened more fully than another for further controlling the flow of warm air to the corn.

The advantages of a device of the kind herein described are many. It is desirable to be able to force the air through the corn. If no forced draft were provided, the air would sometimes pass upwardly through the corn satisfactorily, but the air will not pass so well through corn that shells freely, since the shelled corn sifts toward the bottom of the pile and serves to retard the natural passage of air through the corn.

It is also necessary to force the air through because sometimes the corn will mould before the corn is dried, where the air is simply allowed to pass through in the natural way.

It is desirable to be able to heat the air, because hot air will dry the corn out more quickly and heated air will be drier than atmospheric air.

To force air from the atmosphere without heating and drying it through moist corn on damp days does not properly dry the corn.

Where heated air is used and is forced through the corn, the drying process can be much more accurately controlled.

By regulating the temperature of the air, the accuracy of the control of the drying process can be increased. I place a thermometer 40 near the thermostat 28 for the convenience of the operator in controlling the temperature of the air.

It will therefore be seen that I have provided an apparatus and process for drying corn and according to which warm air may be forced through the corn at a regulated temperature.

It should perhaps be mentioned that this apparatus and process may be used for drying a great variety of fruits and vegetables and may be used for destroying germs or for cooking certain products.

I do not desire to limit myself to the use of air only, with my structure.

Changes may be made in the details of the structure and arrangement of the various parts of my device and the details of the steps of the process without departing from the real spirit and purpose of my invention, and it is my intention to cover by my claims, any modified forms of structure or use of equivalents, which may be reasonably included within their scope.

I claim as my invention:

1. In a drying structure, a plurality of aligned compartments, an air flue alongside thereof, adjustable closure controlled openings between the flue and the respective compartments, means for forcing air through the flue to the compartments, and means for controlling the temperature of the air forced through the flue, said compartments having false floors above said openings adapted to support the contents of the compartments and to permit the free passage of air.

2. In a drying structure, a plurality of aligned compartments, an air flue alongside thereof, adjustable closure controlled openings between the flue and the respective compartments, means for forcing air through the flue to the compartments, and means for controlling the temperature of the air forced through the flue, said compartments having removable false floors above said openings adapted to support the contents of the compartments and to permit the free passage of air.

3. In a drying structure, a plurality of aligned compartments, a plurality of aligned compartments parallel therewith, an air flue arranged between the compartments forming a way, said structure having closure controlled openings between the flue and the respective compartments, and means for forcing heated air through the flue to the compartments whose closures are open, comprising a heating device and a pump element.

4. In a drying structure, a plurality of aligned compartments, a plurality of aligned compartments parallel therewith, an air flue arranged between the compartments forming a way, said structure having closure controlled openings between the flue and the respective compartments, and means for forcing heated air through the flue to the compartments whose closures are open, comprising a heating device and a pump element, and means for controlling the temperature comprising a temperature actuated member in the flue operatively connected with the heating device for controlling the functioning thereof.

5. In a structure of the class described, a plurality of adjacent compartments each having a false foraminous bottom and imperforate side walls, an air chute adjacent to said compartments, the said compartments below the false bottoms having openings into the air chute, adjustable closure devices for said openings, and means for supplying heated air to the air chute.

6. In a structure of the class described, a plurality of adjacent compartments each having a false foraminous bottom and imperforate side walls, an air chute adjacent to said compartments, the said compartments below the false bottoms having openings into the air chute, adjustable closure devices for said openings, and means for supplying heated air to the air chute and for controlling the temperature of such air.

LARS J. SKROMME.